H. OGBORN & T. T. KENDRICK.
Invalid Bed-Bottom.

No. 163,684.
Patented May 25, 1875.

Witnesses

Inventors
Harrison Ogborn
Tunis T. Kendrick

UNITED STATES PATENT OFFICE.

HARRISON OGBORN, OF RICHMOND, INDIANA, AND TUNIS T. KENDRICK, OF NEW YORK, N. Y.

IMPROVEMENT IN INVALID-BED BOTTOMS.

Specification forming part of Letters Patent No. 163,684, dated May 25, 1875; application filed April 15, 1875.

*To all whom it may concern:*

Be it known that we, HARRISON OGBORN, of Richmond, in the county of Wayne and State of Indiana, and TUNIS T. KENDRICK, of the city, county, and State of New York, have invented certain new and useful Improvements in Invalid-Bed Bottoms; and we hereby declare the following to be a full, clear, and exact description of the same, reference being had to the accompanying drawing, making a part of this specification, in which—

Figure 1:
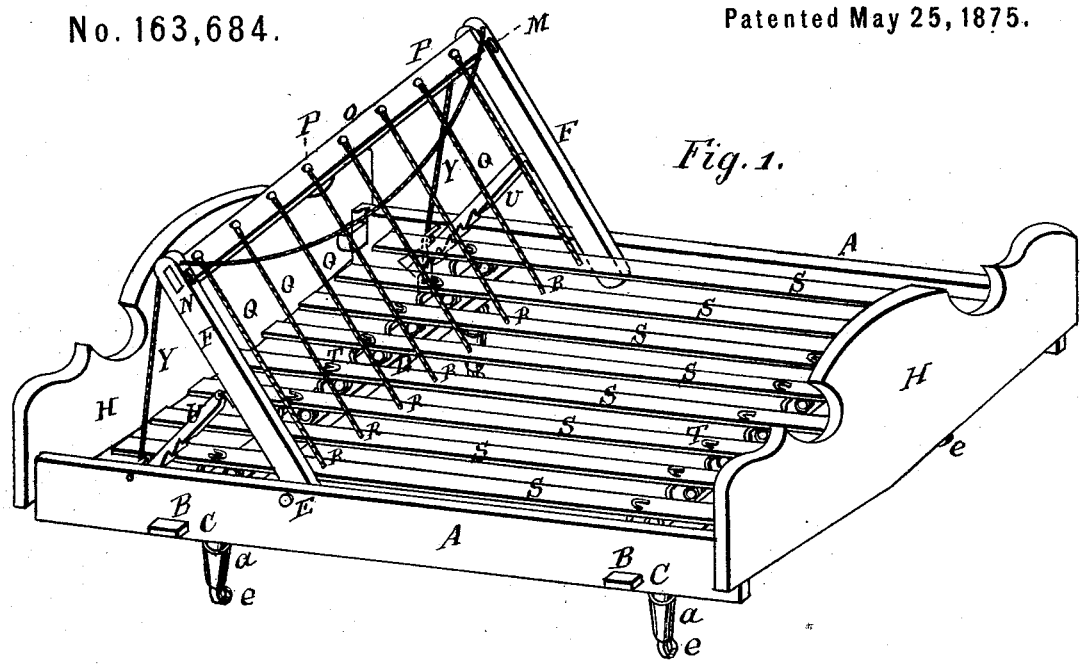
Figure 2:
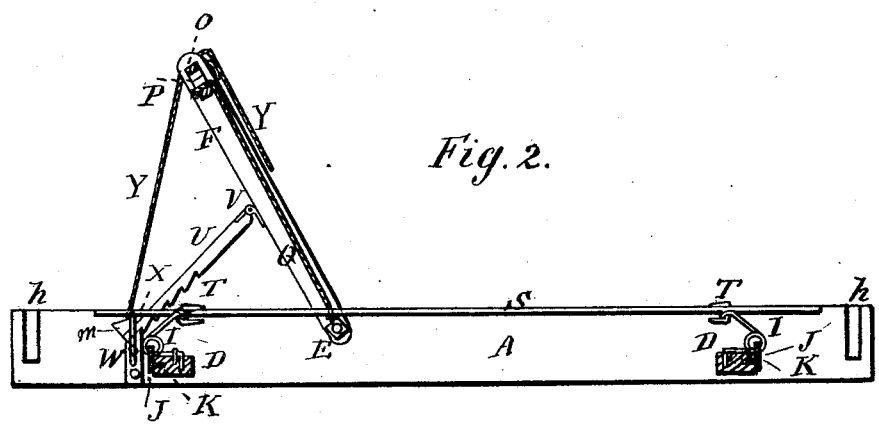
Figure 3:
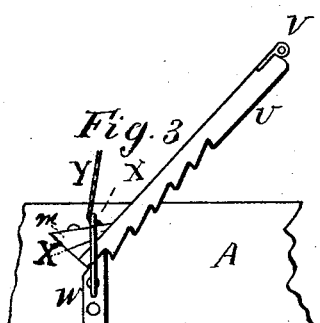
Figure 4:
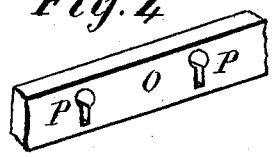

Figure 1 is a perspective view of our invention. Fig. 2 is a longitudinal sectional elevation. Fig. 3 is a detail view of a portion of the devices used for operating the head-rest. Fig. 4 is a detail view of a portion of the cross-bar of the head-rest.

Our invention relates to an improvement in invalid-bed bottoms; and it consists, first, of a pair of pawls and ratchets hinged at their upper ends to the edges of the side pieces of a head-rest, and provided at their lower ends with a wedge-shaped block, in combination with a pair of detents provided with staples or guides, and fixed to the inner sides of the side rails of a bed-bottom, and a cord passed through holes in the corners of the head-rest, and attached to the wedge-shaped blocks upon the lower ends of the pawls and ratchets, for the purpose of producing an improved head-rest for invalid bed-bottoms; secondly, of a series of cords connected at one end to the series of slats which form the bed-bottom proper, and detachably secured at the other end to the cross-bar of the head-rest, for the purposes of forming a back for the head-rest, and of forming an intermediate support for the slats when the head-rest is elevated and in use.

In the accompanying drawings, A are the side pieces of the frame of a bed-bottom, having mortises B B in its sides for the admission of the tenons C C on the ends of the cross-bars D D. A hinge-bolt, E, passes through the side piece, and also through the side pieces F of the head-rest, near its lower end. The sides of the head-rest F are attached to the sides A A at their lower ends, and the upper ends have mortises M M, through which tenons N N on the ends of the cross-bar O pass. This cross-bar O has a series of slots, P P, through it, with an enlargement at one end to admit the passage of knots near the end of cords Q. These cords are long enough to reach through the slots P in the cross-bar of the head-rest, and through the round hole R in the slat S. Near the ends of these cords are knots, one of which passes through the slots P. The hole R in the slat S is too small to allow the lower knot to pass through it, and the upper knot slips down to the small part of the slot P. The cords are thus held firmly in position, and form an easy support for the back. The slats S run nearly the entire length of the bed.

The head-rest is provided with a ratchet-pawl, U, attached to each side piece F by a hinge, V, near its central part, on the under edge. This ratchet-pawl engages with a detent, W, which is firmly attached to the frame A A, and the pawl is held in position by a wide staple, X, which passes over it, and prevents it from rising higher than is necessary, and from being displaced sidewise. This pawl U is provided with a wedge-shaped block, $m$, at its lower end, which prevents it from being drawn entirely through the staple. When desired, this pawl-ratchet is lifted and released by a cord, Y.

The operation of the invention is as follows: The parts are put together, as shown in Fig. 2, and set into an ordinary bedstead, the right width to receive the tenons C C, on the ledges usually found in bedsteads to hold the slats; or, if the bedstead is too wide, the bed-bottom may rest on the slats of the bedstead, the head ones to be removed to allow the pawl to work freely. To raise the head-rest the attendant should take hold of the cross-bar O and raise it to any desired position. The ratchet-pawl will fall by its own weight, and catch on the detent W, and hold the head-rest firmly. To let the head-rest down, or partly down, it is done by drawing on the cord Y, which raises and releases the pawl-ratchet, when the head-rest may be let down to any position desired, from nearly vertical to horizontal.

Having thus described our invention, what we claim, and desire to secure by Letters Patent, is—

1. The ratchet-bars U U, hinged at their upper ends to the side pieces F F, and having at their lower ends the triangular blocks *m m*, in combination with the detent-blocks W W, beveled at their upper ends, the staples X X, and the cord Y, one end of said staple being set into the block W, while the other end embraces the ratchet-bar U, and passes into the side rail, all as shown, and for the purposes set forth.

2. The series of cords Q, connected at their lower ends to the series of slats S, and at their upper ends to the cross-bar O of the head-rest, substantially as and for the purposes set forth.

HARRISON OGBORN.
TUNIS T. KENDRICK.

Witnesses:
W. E. BELL,
R. H. WHITTLESEY.